UNITED STATES PATENT OFFICE.

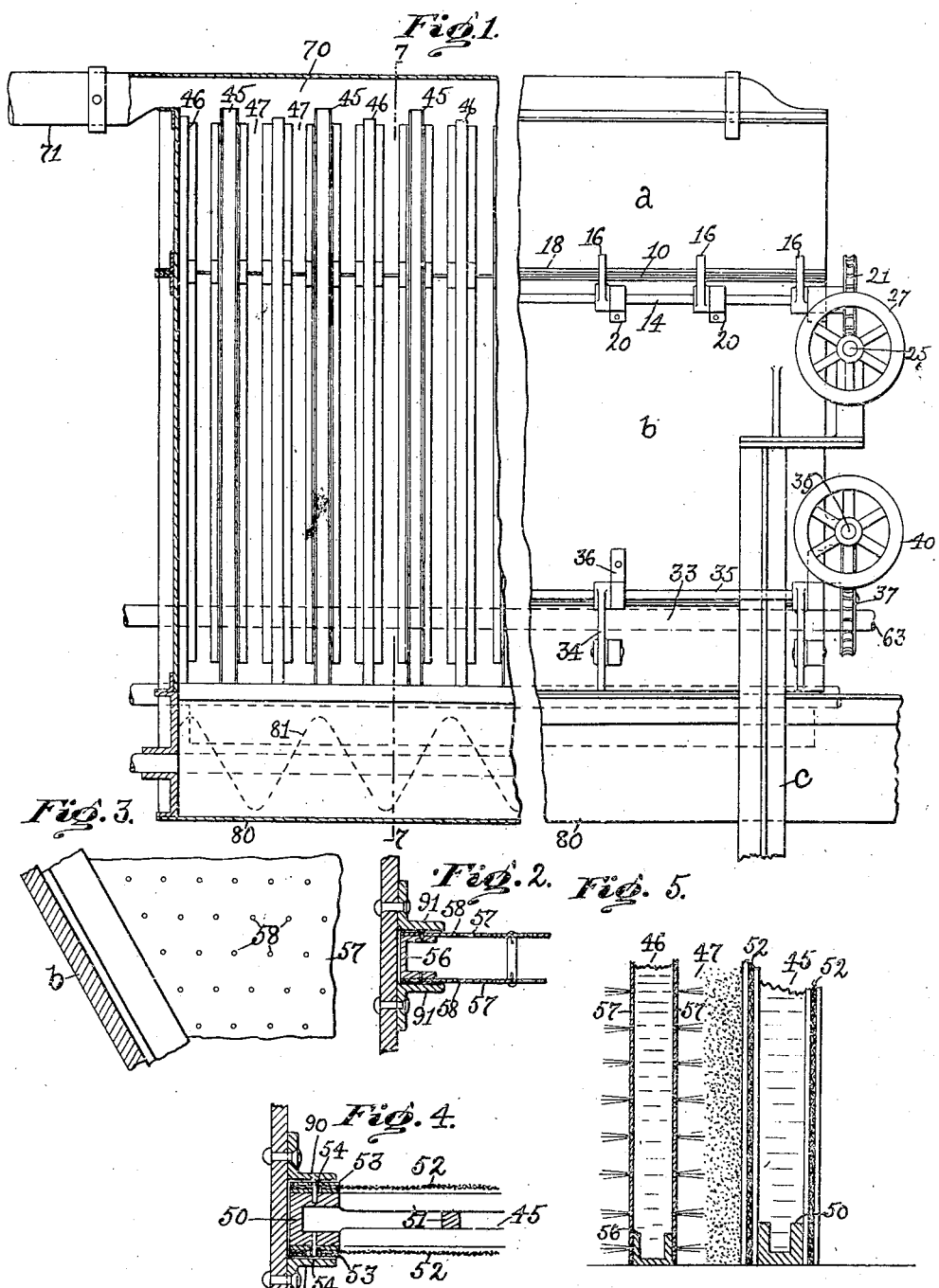

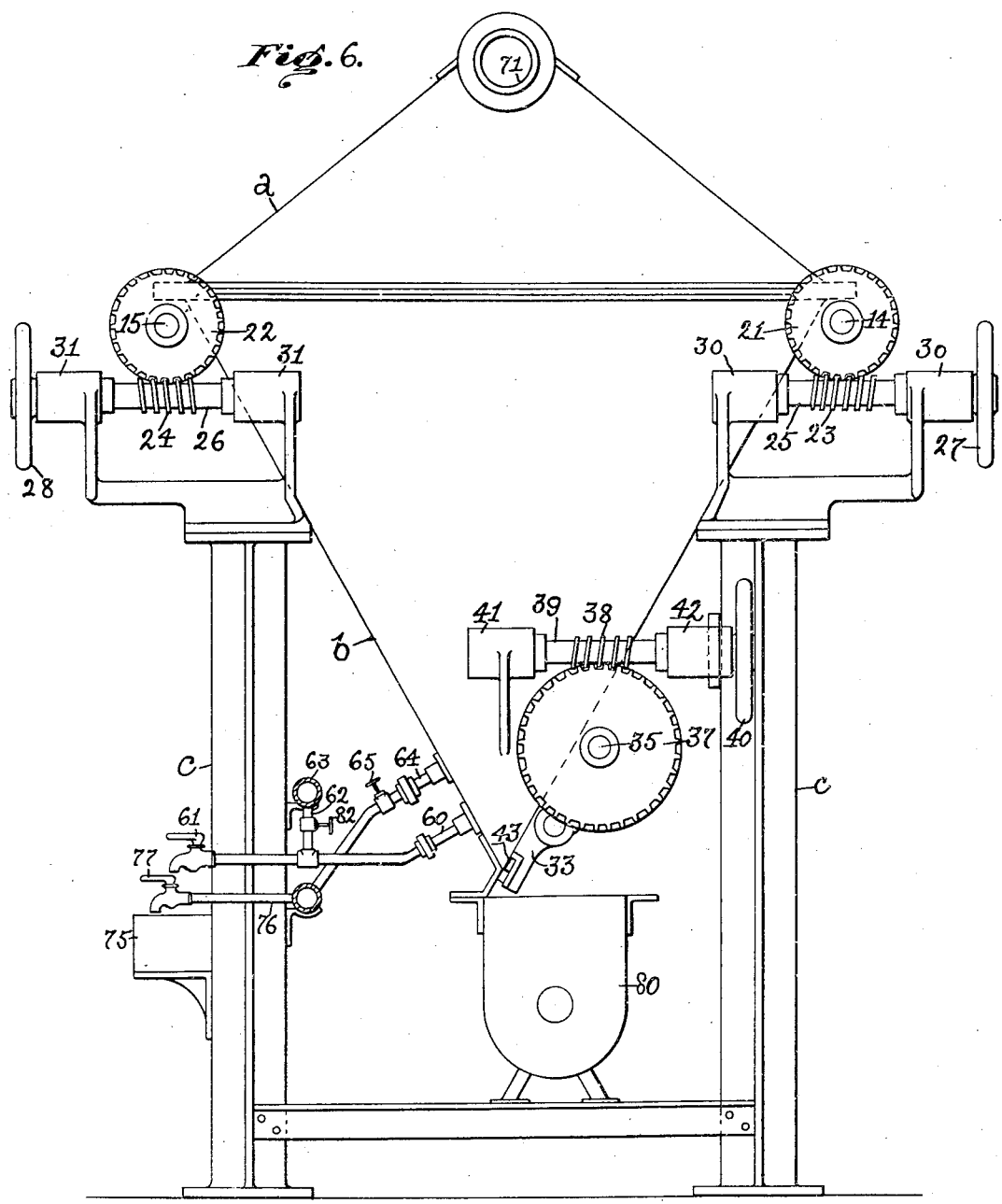

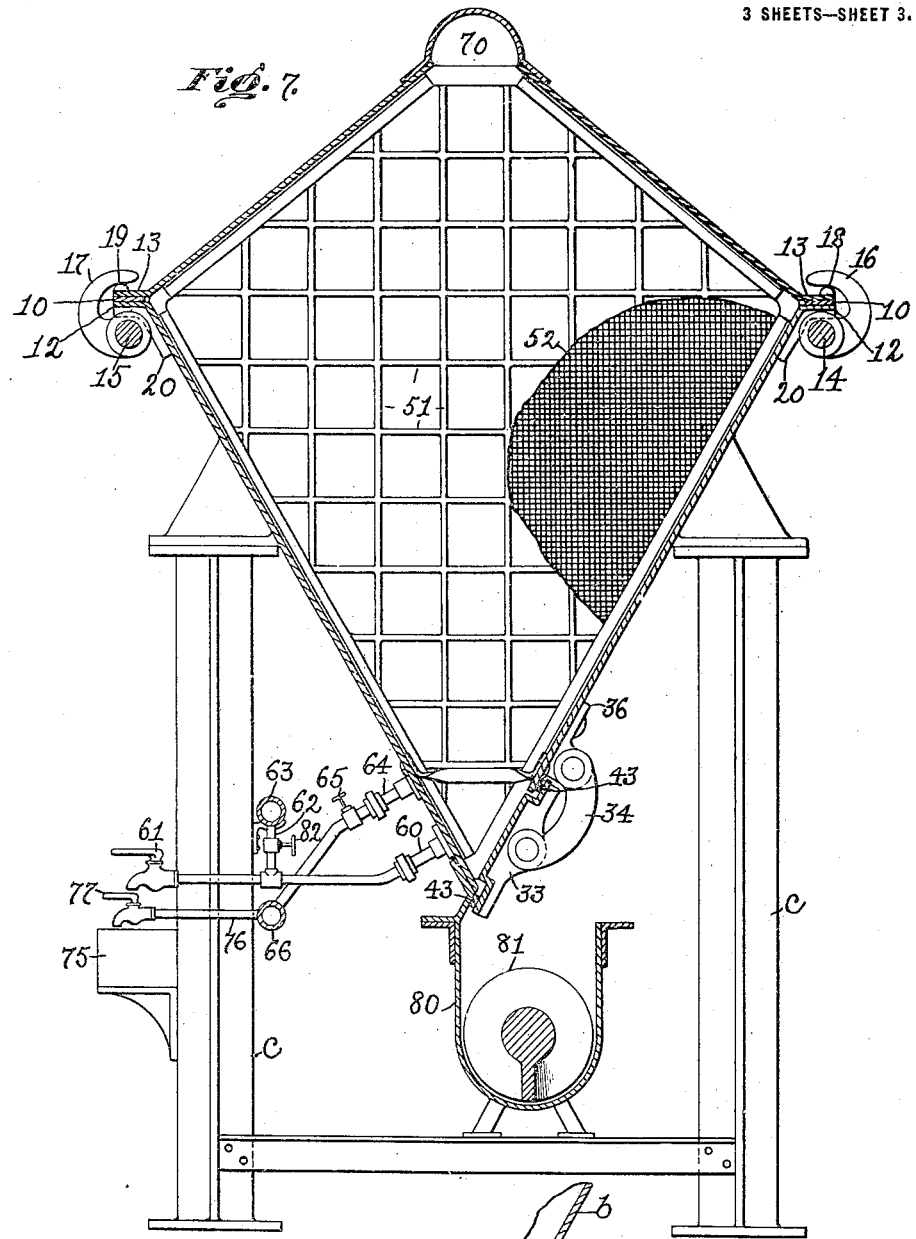

CARL F. HETTINGER, OF BOSTON, MASSACHUSETTS.

FILTERING APPARATUS.

1,251,662.  Specification of Letters Patent.  Patented Jan. 1, 1918.

Application filed March 2, 1915. Serial No. 11,562.

*To all whom it may concern:*

Be it known that I, CARL F. HETTINGER, a citizen of the United States, residing in Boston, in the county of Suffolk and State of Massachusetts, have invented an Improvement in Filtering Apparatus, of which the following description, in connection with the accompanying drawings, is a specification, like characters on the drawings representing like parts.

This invention relates to a filtering apparatus, which is especially designed among other uses, to be employed for filtering wort from a malt, corn or rice mash or sludge used for brewing and distilling purposes.

The invention has for its object to provide a simple, inexpensive and efficient apparatus for the purpose specified and with which a concentrated extract or filtrate may be obtained in a minimum time and at a minimum cost.

The particular features of the invention will be pointed out in the claims at the end of this specification.

Figure 1 is a side elevation with parts broken away of a sufficient portion of a filtering apparatus embodying the invention.

Figs. 2 and 3, details of one of the water supplying members shown in Fig. 1.

Fig. 4, a detail of one of the hollow filter members shown in Fig. 1.

Fig. 5, a detail of a pair of water supplying and filter members shown in Fig. 1.

Fig. 6, an end elevation of the apparatus shown in Fig. 1.

Fig. 7, a cross section on the line 7—7 Fig. 1, and

Fig. 8, a detail to be referred to.

The apparatus herein shown as embodying this invention is provided with a housing or casing, preferably of metal, and composed of an upper part or member $a$ and a lower part or member $b$. The upper and lower members $a$, $b$, are preferably made substantially triangular in cross section, and are arranged with the base of the triangular upper member resting on the base of the triangular lower member, which latter is secured to a suitable foundation or support, which is herein shown as a series of uprights or columns $c$. The upper member $a$ is movable with relation to the lower member $b$, and in the present instance, said upper member is capable of being lifted bodily from the lower member, which may be effected by hand or by a suitable tackle or otherwise. Provision is made for obtaining a fluid-tight joint between the upper and lower members, and to this end strips 10 of rubber or other suitable packing material are interposed between side flanges 12 on the lower member $b$ and side flanges 13 on the upper member $a$. Provision is made for securing the upper member $a$ to the lower member $b$, and to this end, I employ rock shafts 14, 15, which are extended longitudinally of the apparatus on opposite sides of the same, and are provided with a plurality of curved cranks or arms 16, 17, which are designed to engage ribs 18, 19, on the side flanges 13 of the upper member $a$ and force said flanges down toward the flanges 12 on the lower member $b$, and by means of the interposed packing strips 10 effect a fluid-tight joint between said members.

The rock shafts 14, 15, are mounted to turn in bearing brackets 20, which are attached to the sides of the lower member $b$.

The rock shafts 14, 15, may be turned by worm gears 21, 22, fast on said shafts, see Fig. 6, and meshing with worms 23, 24, on shafts 25, 26, provided with hand wheels 27, 28. The shafts 25, 26, are mounted in bearings 30, 31, supported by the columns or uprights $c$. The lower member $b$ is provided in one of its sides at its lower end near the apex of the triangle, with an outlet port or opening 32, see Fig. 8, which extends lengthwise of the lower member, and has coöperating with it a gate or valve 33, which in its closed position forms part of the lower member $b$. The gate or valve 33 is designed to be opened and closed by power and to this end, it is secured to cranks or arms 34 on a rock shaft 35, extended longitudinally of the lower member $b$ and mounted to turn in bearing brackets 36, attached to the said member.

The rock shaft 35 is provided at one end with a worm gear 37, which meshes with and is turned by a worm 38 on a shaft 39, provided with a hand wheel 40 and suitably journaled in stationary bearings 41, 42.

A fluid-tight joint between the valve 33 and the lower member $b$ may be effected by suitable packing material 43, see Figs. 7 and 8. The casing or housing formed by the upper and lower members $a$, $b$, contains within it, a plurality of hollow filter plates or members 45, and a plurality of hollow water supplying members 46, which are alternately arranged with relation to the hollow filter members 45 to form within the casing a series of substantially parallel chambers 47, which are designed to receive the mash, sludge, or other material to be filtered, which material will be hereinafter referred to as mash. The hollow filter members 45 may and preferably will be made as herein shown, see Figs. 4 and 5, and consist of a frame 50 open at its sides and provided with cross bars 51 forming a grid, and having foraminous sides or screens 52 secured to the frame by clamping bars 53, attached to the frame 56 by pins 54 or otherwise. The parts of the filter frame may and preferably will be made of copper.

The hollow water supplying members 46 may be composed of an open frame 56 having secured to its sides plates 57, see Figs. 2 and 3, provided with perforations 58 through which the water is projected into the mash chambers or spaces 47 in the form of jets as represented in Fig. 5.

The hollow filter members 45 are provided at their lower ends with outlet pipes 60, which are extended through the side wall of the lower member b and are detachably secured to the hollow filter members, and said outlet pipes are provided with outlet cocks or valves 61. The outlet pipes 60 are also connected by branch pipes 62 with a pressure pipe 63.

The hollow water supply members 46 have connected with them water inlet pipes 64, see Fig. 7, which extend through a side wall of the lower member b and are detachably secured to said water supply members. The water inlet pipes 64 are provided with suitable valves 65 and are connected with a main water supply pipe 66.

The mash chambers or spaces 47 are in open communication at their upper ends with a common supply chamber or passage 70, which is formed in the upper member a of the casing and has detachably secured to it a supply pipe 71 for the mash, which is admitted into the casing and fills the chambers or spaces 47. The wort or filtrate passes from the mash chambers 47 into the filter members 45 and also into the water supply members 46, and passes out therefrom through the outlet pipe 60 of the filter member and also out through the pipe 64 of the water supply member 45 into the pipe 66, from which it discharges into the grant or receptacle 75 through a branch pipe 76 provided with a valve 77.

The supply of mash is maintained under a pressure ranging from 1 to 10 pounds, until the mash chambers 47 have been entirely filled with the solids or grains, and when this takes place, the supply of mash is cut off, the valve 77 is closed, and warm water under pressure of from 10 to 15 pounds is admitted into the pipe 66. The warm water under pressure is thus admitted into the hollow members 46 and passes through the perforations in the sides thereof in fine streams or jets into the mash chambers, wherein the force of the water jets acts on the solid matter of the mash and forces it against the opposite sides of the filtrate members 45, after the manner represented in Fig. 5, and the filtrate free from the solids passes through the screens 52 into the hollow members 45 and out therefrom through the pipes 60 into the receptacle 75, the outlet valves 61 being opened.

The water jets serve to compact the solids in the mash and form layers of solids against the opposite surfaces of the screens 52, with the result, that the desired soluble matter or wort is extracted from the solids in a minimum time and with a minimum amount of water, thereby obtaining a concentrated extract at a minimum cost.

When the soluble matter or wort has been extracted, the supply of water to the members 46 is shut off, and the gate or valve 33 is opened as shown in Fig. 8, and the solids are discharged by gravity into the trough 80 containing a suitable conveyer 81 which conveys the solids to any desired point. If it is desired to wash the screens 52, the valves 61 are closed, and water is turned on in the supply pipe 63 and passes through the pipes 62, 60, into the filter members 45 and out therefrom through the screens 52, thereby removing the solids from the outer surfaces of the screens and carrying them through the discharge port 32 into the trough 80. The branch pipe 62 is normally closed by a valve 82.

The screw conveyer 81 may be operated in any suitable manner well understood.

If it becomes necessary to remove any of the parts within the casing, this can be done in a minimum time, as the cover or upper member a can be unlocked by merely turning the hand wheels 27, 28, so as to throw back the cranks or arms 16, 17, after which the upper member a can be removed by hand or power, leaving the water supply members and the filter members accessible. The lower member b is provided with suitable guides 90, 91 for the members 45, 46.

I have herein described one construction of apparatus embodying the invention, but I do not desire to limit myself to the particular construction shown.

Claims:

1. In a filtering apparatus, in combination, a casing provided with an inlet for the material to be filtered, a plurality of hollow filter members extended transversely of the casing, and a plurality of hollow water supplying members located in said casing and extended transversely of the casing between said filter members to form chambers between the latter, said water supplying members being of substantially the same area as the said filter members and provided with a plurality of water outlets opposing said filter members, a water inlet for said water supplying members, and a filtrate outlet for said filter members.

2. In a filtering apparatus, in combination, a casing, a hollow filter member located therein and provided with a screen through which the filtrate passes into said member and having an outlet for the filtrate communicating with the outside of said casing, and a hollow water supplying member having a water inlet communicating with the outside of said casing and provided with a plurality of water outlets opposing the screen of the hollow filter member to cause the water discharged into the casing to form a layer of solid matter on said screen through which the water passes into the said filter member.

3. In a filtering apparatus, in combination, a casing, a removable filter member extended transversely of the casing and provided with a screen through which the filtrate passes, a removable hollow water supplying member of substantially the same area as the filter member and extended transversely of the casing and supported by the inner walls of the same, and provided with water outlets coöperating with said screen to project toward the screen a plurality of jets of water to force the solid matter onto the screen.

4. In a filtering apparatus, in combination, a casing having a stationary lower member and a movable upper member provided with an inlet for the material to be filtered, a plurality of hollow filter members extended transversely of the casing and supported by said lower member, a hollow fluid supplying member supported by said lower member and interposed between said filter members and separated therefrom to form with said filter members chambers on opposite sides of said fluid-supplying member, said chambers being extended transversely of the lower member of said casing, and a fluid inlet for said fluid supplying member and a filtrate outlet for the filter members.

In testimony whereof, I have signed my name to this specification in the presence of two subscribing witnesses.

CARL F. HETTINGER.

Witnesses:
JAS. H. CHURCHILL,
J. MURPHY.

Copies of this patent may be obtained for five cents each, by addressing the "Commissioner of Patents, Washington, D. C."